US010288784B2

(12) United States Patent
Wu et al.

(10) Patent No.: US 10,288,784 B2
(45) Date of Patent: May 14, 2019

(54) BLUE LIGHT FILTERING FILM AND METHOD OF MANUFACTURING THE SAME

(71) Applicant: BOE TECHNOLOGY GROUP CO., LTD., Beijing (CN)

(72) Inventors: Yanbing Wu, Beijing (CN); Yingyi Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/521,881

(22) PCT Filed: May 18, 2016

(86) PCT No.: PCT/CN2016/082474
§ 371 (c)(1),
(2) Date: Apr. 25, 2017

(87) PCT Pub. No.: WO2017/152495
PCT Pub. Date: Sep. 14, 2017

(65) Prior Publication Data
US 2018/0088259 A1 Mar. 29, 2018

(30) Foreign Application Priority Data

Mar. 11, 2016 (CN) .......................... 2016 1 0139749

(51) Int. Cl.
*G02B 5/20* (2006.01)
*G02B 3/00* (2006.01)
(Continued)

(52) U.S. Cl.
CPC ............... *G02B 5/20* (2013.01); *G02B 3/005* (2013.01); *G02B 5/02* (2013.01); *G02B 5/0215* (2013.01);
(Continued)

(58) Field of Classification Search
CPC .... G02B 5/02; G02B 5/20; G02B 3/00; G02F 1/1335
See application file for complete search history.

(56) References Cited

U.S. PATENT DOCUMENTS 9,995,958 B2 * 6/2018 Park ................... G02F 1/133617
2015/0362757 A1 * 12/2015 Fu ............................ G02C 7/04
351/159.29
2016/0041317 A1 * 2/2016 Kim ....................... G02B 5/201
359/891

FOREIGN PATENT DOCUMENTS

CN 101334495 A 12/2008
CN 102081171 A 6/2011
(Continued)

OTHER PUBLICATIONS

International Search Report and Written Opinion (including English translation of Box V) dated Nov. 29, 2016, for corresponding PCT Application No. PCT/CN2016/082474.
(Continued)

Primary Examiner — Daniel Petkovsek
(74) Attorney, Agent, or Firm — Kinney & Lange, P.A.

(57) ABSTRACT

The present disclosure provides a blue light filtering film. The blue light filtering film has a non-planar structure such that, for light that is emitted at any incident angle from at least one side of the blue light film, a transmission light of the blue light filtering film involves small chromatic polarization. The blue light filtering film of the present disclosure is configured such that light lengths of the incident light in layers of the film do not change to great extent along with the angle θ and thus chromatic polarization is greatly alleviated, thereby not only achieving the effect of preventing damage caused by blue light but also eliminating chromatic polarization influence due to change of the light length for oblique incident light.

14 Claims, 2 Drawing Sheets

(51) Int. Cl.
*G02B 5/02* (2006.01)
*G02F 1/1335* (2006.01)
*G02B 5/28* (2006.01)
(52) U.S. Cl.
CPC .......... *G02B 5/0294* (2013.01); *G02B 5/283* (2013.01); *G02B 5/285* (2013.01); *G02F 1/133526* (2013.01)

(56) References Cited

FOREIGN PATENT DOCUMENTS

| CN | 102830457 A | 12/2012 |
|---|---|---|
| CN | 104793272 A | 7/2015 |
| CN | 104849789 A | 8/2015 |
| CN | 105093377 A | 11/2015 |

OTHER PUBLICATIONS

First Chinese Office Action dated Feb. 14, 2017, for corresponding Chinese Application No. 201610139749.3.
Second Chinese Office Action, for Chinese Patent Application No. 201610139749.3, dated Jul. 3, 2017, 8 pages.
Chinese Rejection Decision, for Chinese Patent Application No. 201610139749.3, dated Sep. 30, 2017, 6 pages.

\* cited by examiner

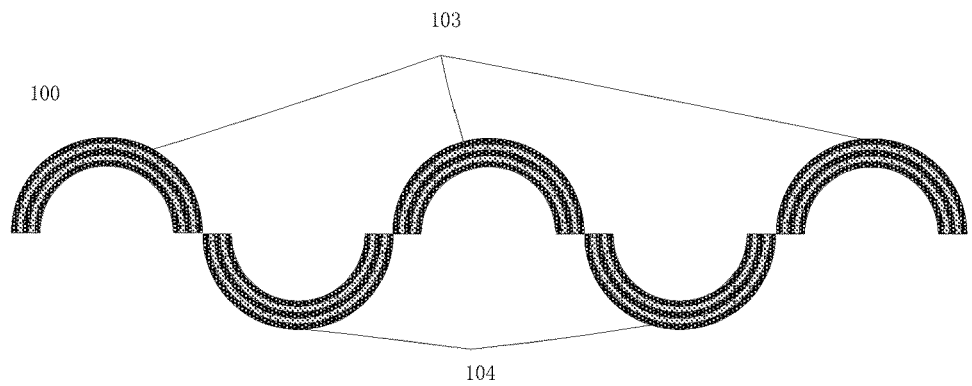
Fig. 4
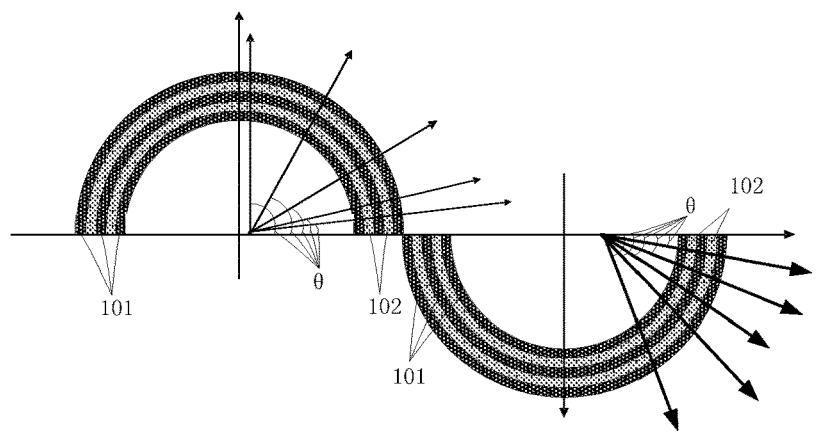
Fig. 5
forming a substrate template of the blue light filtering film, in which at least one surface of the substrate template is non-planar
forming the blue light filtering film on the non-planar surface of the substrate template
Fig. 6

BLUE LIGHT FILTERING FILM AND METHOD OF MANUFACTURING THE SAME

CROSS-REFERENCE TO RELATED APPLICATIONS

This application is a Section 371 National Stage Application of International Application No. PCT/CN2016/082474, filed on May 18, 2016, entitled "BLUE LIGHT FILTERING FILM AND METHOD OF MANUFACTURING THE SAME", which claims priority to Chinese Application No. 201610139749.3, filed on Mar. 11, 2016, incorporated herein by reference in their entirety.

BACKGROUND

1. Technical Field

The present disclosure relates to the field of blue light shielding technology, and particularly to a blue light filtering film and a method of manufacturing the same.

2. Description of the Related Art

Blue light is a high-energy visible light and may directly pass through human's cornea and lens to yellow spot zone of fundus oculi, accelerating oxidation of cells in the yellow spot zone and causing photochemical damage of retina. Especially, damage caused by blue light is more seriously for children. Blue light has been approved to be the most harmful visible light. As blue light exists widely in artificial light sources, it is a problem to be urgently solved to reduce damage caused by the blue light from a display. Damage caused by blue light is mainly brought from high-energy blue lights with wavelengths ranged from 440 nm to 470 nm. There are some existing anti blue light products, such as an optical film, for filtering some of high-energy blue lights, with wavelengths ranged from 440 nm to 470 nm, emitted by LEDs.

SUMMARY

In order to solve at least some problems in prior art, there is provided a blue light filtering film and a method of manufacturing the same.

The present disclosure provides a blue light filtering film that has a non-planar structure such that, for a light that is emitted at any incident angle from at least one side of the blue light filtering film, a transmission light of the blue light filtering film involves a small chromatic polarization.

In an embodiment, the blue light filtering film in the non-planar structure has a plurality of projections that are protruded towards one or either side of the blue light filtering film to form a regularly-arranged projection structure or projection-recess structure.

In an embodiment, the blue light filtering film (100) comprises N×M hollow hemispheric projections (103), which are closely arranged as an array of N rows and M columns of hollow hemispheric projections, where M and N are positive integer.

In an embodiment, the blue light filtering film (100) comprises N rows of hollow hemispheric projections and N rows of hollow hemispheric recesses, in which each of the rows of the hollow hemispheric projections comprises M hollow hemispheric projections (103) and each of the rows of hollow hemispheric recesses comprises M hollow hemispheric recesses (104), the N rows of hollow hemispheric projections and the N rows of hollow hemispheric recesses are closely and alternately arranged to form an array comprising the hollow hemispheric projections and the hollow hemispheric recesses, where M and N are positive integer.

In an embodiment, the blue light filtering film (100) comprises an array of N rows and M columns of hollow hemispheric projections and hollow hemispheric recesses, wherein each of the rows of the projection-recess array comprises M hollow hemispheric projections (103) and hollow hemispheric recesses (104) that are closely and alternately arranged, and each of the columns of the projection-recess array comprises N hollow hemispheric projections (103) and hollow hemispheric recesses (104) that are closely and alternately arranged, where M and N are positive integer.

In an embodiment, the blue light filtering film (100) comprises N hollow half-cylindrical projections that are closely and alternately arranged, where N is a positive integer.

In an embodiment, the blue light filtering film (100) comprises an array comprising N hollow half-cylindrical projections and N hollow half-cylindrical recesses that are closely and alternately arranged, where N is a positive integer.

In an embodiment, the blue light filtering film (100) comprises K+1 first refractive material layers (101) and K second refractive material layers (102), where K is a natural number, wherein the K+1 first refractive material layers (101) and K second refractive material layers (102) are alternately arranged, thicknesses of the first refractive material layers and the second refractive material layers are one quarter of a wavelength of a blue light, and refractivity of the first refractive material layer is greater than refractivity of the second refractive material layer.

In an embodiment, the present disclosure provides a substrate for displaying, characterized by comprising any one of the above blue light filtering film.

In an embodiment, the substrate for displaying comprises an array substrate or a color filter substrate.

In an embodiment, the array substrate further comprises a substrate and a plurality of pixel units;
the pixel units are provided at one side of the substrate and the blue light filtering film (100) is provided at the other side of the substrate, or the blue light filtering film (100) is provided between the substrate and the pixel units.

The present disclosure provides a display including any one of the above substrate for displaying.

The present disclosure further provides a method of manufacturing any one of the above blue light filtering films, the method comprises:
manufacturing a substrate template of the blue light filtering film, at least one surface of the substrate template being a non-planar surface;
forming the blue light filtering film on the non-planar surface of the substrate template.

In an embodiment, the forming a substrate template of the blue light filtering film specifically comprises: forming, on at least one surface of the substrate, an array of hemispheric projections, or an array of hemispheric projection-recess and half-cylindrical projections that are closely and alternately arranged, or an array of half-cylindrical projections that are closely arranged, or an array of half-cylindrical projections and half-cylindrical recesses that are closely and alternately arranged, to form the substrate template.

In an embodiment, the forming the blue light filtering film on the non-planar surface of the substrate template specifically comprises:
forming the first refractive material layers (101) and the second refractive material layers (102), which are arranged alternately, in sequence on the non-planar surface of the substrate template, to form the blue light filtering film (100); or forming the first refractive material layers (101) and the second refractive material layers (102), which are arranged alternately, in sequence on the non-planar surface of the substrate template, to form a multi-layer film, and placing the multi-layer film on the non-planar surface of the substrate template and implementing a pressing molding, to form the blue light filtering film (100).

In an embodiment, the first refractive material layers (101) and the second refractive material layers (102), which are arranged alternately, are formed in sequence by an evaporation process or a chemical vapor deposition process.

BRIEF DESCRIPTION OF THE DRAWINGS

FIG. 4 is a longitudinal cross section view of a blue light filtering film according to another embodiment of the present disclosure;

FIG. 5 is a partially enlarged schematic view of the hollow hemispheric projection and the hollow hemispheric recess of the blue light filtering film according to the another embodiment of the present disclosure;

FIG. 6 is a flow chart of a method of manufacturing the blue light filtering film according to an embodiment of the present disclosure.

DETAILED DESCRIPTION OF THE EMBODIMENTS

In order to make objects, technical schemes and advantages of the present disclosure more clear, description in detail of the present disclosure will be further made by referring to the embodiments in conjunction with the drawings.

Figure 1:
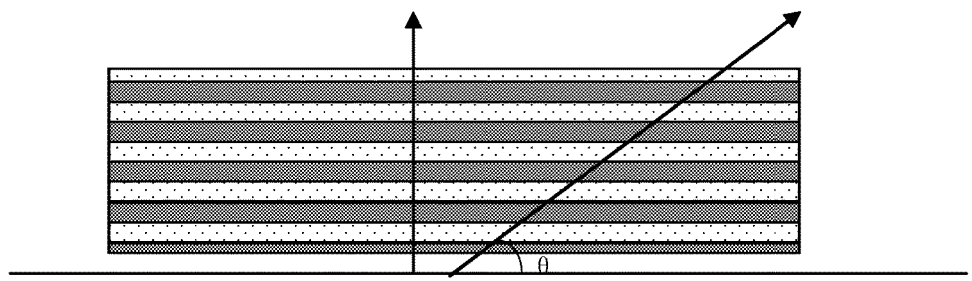
FIG. 1 illustrates the structure of a blue light filtering film.

A common anti blue light film is provided in a multi-layer structure, i.e., high refractive materials and low refractive materials are arranged alternately. As shown in FIG. 1, a thickness of a high refractive material is $$H = \frac{\lambda}{4}$$

and a thickness of a low refractive material is $$L = \frac{\lambda}{4},$$

that is, lights with wavelengths less than λ will be cut off to a certain extent.

However, when viewed laterally with relative to a normal of the blue light filtering film of this structure, serious chromatic polarization will happen. That is, when viewed from a direction deviating from a horizontal line by an angle of θ, a light length of each layer becomes $$\frac{\lambda}{4\sin\theta}$$

and thus lights with other wavelengths greater than λ will be cut off, thereby occurring chromatic polarization. For example, provided that λ=450 nm, that is, it is desired to cut off some of blue lights with a wavelength λ of 450 nm, however, when viewed at an oblique angle of 45 degree, an effective thickness of a single layer of the film becomes $$\frac{1}{4}\frac{\lambda}{0.707},$$

that is, some of blue lights with a wavelength λ of 636 nm will be cut off at this angle, thereby occurring chromatic polarization and thus degrading performance of the blue light filtering film.

Figure 2:
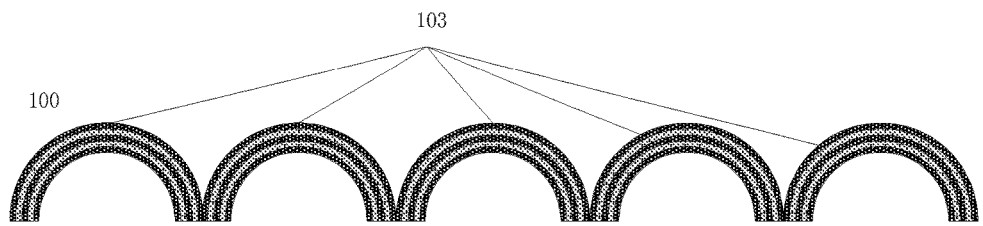
FIG. 2 is a longitudinal cross section view of a blue light filtering film according to an embodiment of the present disclosure.
Figure 3:
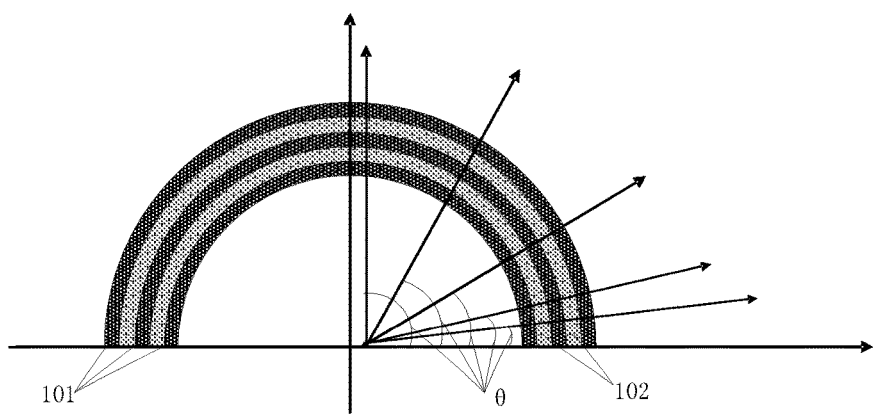
FIG. 3 is a partially enlarged schematic view of a hollow hemispheric projection of the blue light filtering film according to the embodiment of the present disclosure.

Referring to FIGS. 2 and 3, a longitudinal cross section of a blue light filtering film 100 according to an embodiment of the present disclosure is shown in FIG. 2 and a partially enlarged schematic view of a hollow hemispheric projection 103 of the blue light filtering film 100 is shown in FIG. 3. The blue light filtering film 100 according to the embodiment of the present disclosure is as a whole a protruded film including N×M hollow hemispheric projections 103, which are closely arranged to form a projection array with N rows and M columns. The longitudinal cross sections of each row and each column of the projection array are both in the shape of closely-arranged half-ring projections, where both M and N are positive integer.

In this embodiment, the blue light filtering film 100 includes K+1 first refractive material layers 101 and K second refractive material layers 102, where K is a nature number. The K+1 first refractive material layers 101 and K second refractive material layers 102 are alternately configured. A thickness of the first refractive material layer 101 and the second refractive material layer 102 are both one quarter of a wavelength of a blue light. Refractivity of the first refractive material layer 101 is greater than that of the second refractive material layer 102.

When a blue light is incident to the blue light filtering film 100, according to constructive interference and destructive interference law of light, all the reflective lights on interfaces from the second refractive material layers 102 to the first refractive material layers 101 are of the same phase, and, as the refractivity of the second refractive material layer 102 is smaller than that of the first refractive material layer 101, the reflective light and the incident light are of reverse phase due to half-wave loss. For all the reflective lights on the interfaces from the first refractive material layers 101 to the second refractive material layers 102, phase difference between all the reflective lights is an odd number times of 180 degree in phase due to optical length difference between the first refractive material layer 101 and the second refractive material layer 102. As the incident light and the above reflective lights are of reverse phase, all reflective lights are of the same phase and thus are overlapped with one another and thus enhanced. Most of the incident blue light thus may be reflected by the blue light filtering film 100 and nearly no blue light can transmit through the blue light filtering film 100, thereby achieving blue light filtering effect.

Further, as the blue light filtering film 100 is a projection array composed of closely-arranged hollow hemispheric projections 103, when viewed from a protruded side of the blue light filtering film 100, no matter what an angle θ of a viewing direction of a viewer relative to a horizontal direction is, that is, no matter what an emitting angle of an incident light at the other side of the blue light block film 100 is, light lengths of the incident light in the first refractive material layers 101 and the second refractive material layers 102 would not deviate too many from the thicknesses of the first refractive material layers 101 and the second refractive material layers 102, that is, light lengths of the incident light would not change to great extent along with the angle θ, thereby mainly reflecting the blue light without filtering too many lights with other wavelengths. Thus, the phenomenon that chromatic polarization happens is greatly alleviated. The blue light filtering film not only achieves anti blue light effect, but also eliminates chromatic polarization influence of oblique incident light due to change of the light length.

As high-energy blue light with a wavelength ranged from 440 nm to 470 nm is the main light that damages human's eyes, in an embodiment, the thicknesses of the first refractive material layers 101 and the second refractive material layers 102 are configured to one quarter of a range from 440 nm to 470 nm, that is, are configured from 110 nm to 117.5 nm. It is shown from theory calculation that the greater the number of layers of the blue light filtering film 100 is, the higher reflectivity and thus the better performance of filtering the blue light are obtained. However, considering manufacturing process and implementation of the blue light filtering film 100, it is not suitable to configure too many layers, and excess layers will render an excess thickness of the blue light filter film, which brings adverse influence on the thickness of the display device. Thus, in an embodiment, the total number of the first refractive material layers 101 and the second refractive material layers 102 of the blue light filtering film 100 is set as 2K+1, such that the thickness of the blue light filtering film 100 will not exceed 10 micron. Greater difference between refractivity of the first refractive material layer 101 and that of the second refractive material layer 102 becomes, higher the reflectivity of the blue light filtering film 100 is and better blue light filtering performance is. In an embodiment, the first refractive material layer 101 is made of at least one of silicon nitride, titanium dioxide and zirconium dioxide, in which refractivity of silicon nitride is ranged from 1.7 to 3.0, refractivity of titanium dioxide is ranged from 2.55 to 2.76 and refractivity of zirconium dioxide is ranged from 2.1 to 2.2; the second refractive material layer 102 is made of at least one of silicon dioxide, magnesium fluoride and aluminum oxide, in which refractivity of silicon dioxide is ranged from 1.42 to 1.55, refractivity of magnesium fluoride is ranged from 1.36 to 1.38 and refractivity of aluminum oxide is ranged from 1.6 to 1.8. For convenience of manufacture and assemble, a height of the blue light filtering film 100 is not oversize. In an embodiment, an outer diameter r of a hollow hemispheric projection of the blue light filtering film 100 is not greater than 10 microns, and values of N and M may be determined according to an area to be protected by the blue light filtering film 100 and the size of the hollow hemispheric projection.

There is provided a blue light filtering 100 according to a second embodiment of the present disclosure, and in order to achieve the purpose of brief description, the description of any technical features of the first embodiment for same or similar application as those in this embodiment are incorporated herein and are not repeatedly described.

Referring to FIGS. 4 and 5, FIG. 4 illustrates a cross section view of the blue light filtering film 100 according to another embodiment of the present disclosure and FIG. 5 illustrates a partially enlarged schematic view of a hollow hemispheric projection 103 and a hollow hemispheric recess 104 of the blue light filtering film 100. The blue light filtering film 100, as a whole, includes N rows of hollow hemispheric projections and N rows of hollow hemispheric recesses, and each row of hollow hemispheric projections include M hollow hemispheric projections 103 and each row of hollow hemispheric recesses include M hollow hemispheric recesses 104. The N rows of hollow hemispheric projections and the N rows of hollow hemispheric recesses are arranged closely and alternately with one another to form a projection-recess array, and a longitudinal cross section of each column of the projection-recess array is in a shape composed of half-ring projections and half-ring recesses arranged closely and alternately, in which M and N are positive integer.

Since the blue light filtering film 100 includes the projection-recess array composed of the hollow hemispheric projections 103 and the hollow hemispheric recesses 104 that are arranged closely with one another, when viewed the blue light filtering film 100 from a protruded side of the blue light filtering film 100, whatever an angle θ of the viewing direction of a user relative to a horizontal direction is, i.e., no matter what an emitting angle of an incident light from the other side of the blue light filtering film 100 is, light lengths of the incident light in the first refractive material layers 101 and the second refractive material layers 102 will not deviate too many from the thicknesses of the first refractive material layers 101 and the second refractive material layers 102, that is, the light lengths of the incident light will not change to great extent along with the angle θ, thereby mainly reflecting the blue light without filtering too many lights with other wavelengths. Similarly, when viewed to the blue light filtering film 100 from a recessed side of the blue light filtering film 100, whatever an angle θ of the viewing direction of the user relative to the horizontal direction is, i.e., no matter what an emitting angle of an incident light from the other side of the blue light filtering film 100 is, light lengths of the incident light in the first refractive material layers 101 and the second refractive material layers 102 will not deviate too many from the thicknesses of the first refractive material layers 101 and the second refractive material layers 102, that is, the light lengths of the incident light will not change to great extent along with the angle θ, thereby mainly reflecting the blue light without filtering too many lights with other wavelengths. The phenomenon that chromatic polarization happens at either side of the blue light filtering film 100 may be greatly alleviated. The blue light filtering film 100 not only achieves anti blue light effect but also eliminates the problem of chromatic polarization caused by an obliquely incident light due to change of the light length.

There is provided a blue light filtering 100 according to a still embodiment of the present disclosure, and in order to achieve the purpose of brief description, the description of any technical features of the first embodiment for same or similar application as those in this embodiment are incorporated herein and are not repeatedly described.

The blue light filtering film 100, as a whole, includes a projection-recess film in a shape of a projection-recess array including N rows and M columns. Each row of the projection-recess array includes M hollow hemispheric projections 103 and hollow hemispheric recesses 104, which are arranged closely and alternately with one another. Each column of the projection-recess array includes N hollow hemispheric projections 103 and hollow hemispheric recesses 104, which are also arranged closely and alternately with one another. The longitudinal cross sections of each row and each column of the projection-recess array are in a shape formed by half-ring projections and half-ring recesses that are arranged closely and alternately. The longitudinal cross section of the blue light filtering film 100 according to the still embodiment of the present disclosure is shown in FIG. 4, and the longitudinal cross section of the hollow hemispheric projections 103 and the hollow hemispheric recesses 104 is shown in FIG. 5, in which M and N are positive integer.

Similar to those in the above embodiment, since the blue light filtering film 100 includes a projection-recess array composed of hollow hemispheric projections 103 and hollow hemispheric recesses 104 that are arranged closely, the blue light filtering film 100 may also alleviate the phenomenon that chromatic polarization happens at either side of the blue light filtering film 100. The blue light filtering film 100 not only achieves anti blue light effect but also eliminates the problem of chromatic polarization caused by an obliquely incident light due to change of the light length.

There is provided a blue light filtering 100 according to a further embodiment of the present disclosure, and in order to achieve the purpose of brief description, the description of any technical features of the first embodiment for similar application as those in this embodiment are incorporated herein and are not repeatedly described.

In this embodiment, the blue light filtering film 100 includes an undulate film composed of N hollow half-cylindrical projections that are arranged closely. The longitudinal cross section of the blue light filtering film 100 according to the further embodiment of the present disclosure is similar to that in FIG. 2 and is also in a shape of half-ring projections that are arranged closely, in which N is a positive integer.

In an embodiment, an outer diameter r of a hollow half-cylindrical projection of the blue light filtering film 100 does not exceed 10 microns. The value of N may be determined according to an area to be protected by the blue light filtering film 100 and a size of the hollow half-cylindrical projection.

There is provided a blue light filtering 100 according to an embodiment of the present disclosure, and in order to achieve the purpose of brief description, description of any technical features of the first embodiment for similar application as those in this embodiment are incorporated herein and are not repeatedly described.

In the embodiment, the blue light filtering film 100 includes an undulate film composed of N hollow half-cylindrical projections and N hollow half-cylindrical recesses that are arranged closely and alternately. The longitudinal cross section of the blue light filtering film 100 according to the fifth embodiment of the present disclosure is similar to that in FIG. 4 and is also in a shape of half-ring projections and half-ring recesses that are arranged closely and alternately, in which N is a positive integer.

Similar to those in the above embodiments, when viewed from a side of the blue light filtering film 100, no matter what an angle θ of a viewing direction of a viewer relative to a horizontal direction is, light lengths of the incident light in each of the first refractive material layers 101 and the second refractive material layers 102 would not deviate too many from the thickness of the first refractive material layers 101 and the second refractive material layers 102, that is, light lengths of the incident light would not change to great extent along with the angle θ, thereby mainly reflecting the blue light without filtering too many lights with other wavelengths. Thus, the phenomenon that chromatic polarization happens may be greatly alleviated. The blue light filtering film not only achieves anti blue light effect but also eliminates the problem of chromatic polarization caused by an obliquely incident light due to change of the light length.

According to an embodiment of the present disclosure, there is provided a substrate for displaying, which includes the blue light filtering film 100 according to any one of the above embodiments.

The substrate for displaying may bean array substrate of a LCD. The array substrate may further include a substrate and a plurality of pixel units, which are configured at one side of the substrate. The blue light filtering film 100 is configured at the other side of the substrate. That is, the blue light filtering film 100 is located between the array substrate and a lower filter; or, the blue light filtering film 100 is configured between the substrate and the pixel units. The blue light filtering film 100 may reflect most of the blue light emitted by the backlight module, thereby reducing damage caused by the blue light emitted from the backlight module.

The substrate for displaying may be a color film substrate of a LCD. The color film substrate may further include a substrate and a plurality of pixel units, each of pixel units includes a color film layer composed of a red photoresist R, a green photoresist G and a blue photoresist B, and a black matrix. The pixel units are configured at one side of the substrate and the blue light filtering film 100 is configured at the other side. That is, the blue light filtering film 100 is located between the color film substrate and an upper filter; or, the blue light filtering film 100 is configured between the substrate and the pixel units. The blue light filtering film 100 reflects most of the blue light emitted by the backlight module, thereby reducing damage caused by the blue light emitted from the backlight module.

The substrate for displaying may be an array substrate of an OLED. The array substrate may further include a substrate and a plurality of pixel units. The blue light filtering film 100 is configured at a light-outgoing side of the array substrate. That is, when an anode electrode of the pixel unit is transparent while a cathode thereof is non-transparent, the pixel units are configured at one side of the substrate while the blue light filtering film 100 is configured at the other side of the substrate, or the blue light filtering film 100 is configured between the substrate and the pixel units. When an anode electrode of the pixel unit is non-transparent while a cathode thereof is semitransparent, the blue light filtering film 100 may be configured above the cathodes of the pixel units. When an anode electrode of the pixel unit is transparent while a cathode thereof is semitransparent, the blue light filtering film 100 may be configured at the other side of the substrate, between the substrate and the pixel units and above the cathodes of the pixel units. The blue light filtering film 100 may reflect most of the blue light emitted by the pixel units, thereby reducing damage caused by the blue light emitted by the pixel units.

According to an embodiment of the present disclosure, there is provided a display including the substrate for displaying according to any one of the above embodiments.

According to an embodiment of the present disclosure, there is provided a method of manufacturing the blue light filtering film 100 according to any one of the above embodiments. As shown in FIG. 6, the method includes:

forming a substrate template of the blue light filtering film, in which at least one surface of the substrate template is non-planar; and forming the blue light filtering film 100 on the non-planar surface of the substrate template.

The forming a substrate template of the blue light filtering film specifically includes: forming, on at least one surface of the substrate, an array of hemispheric projections, or an array of hemispheric projections-recesses, or a structure of half-cylindrical projections that are closely arranged, or a structure of half-cylindrical projections and half-cylindrical recesses that are closely and alternately arranged, to form the substrate template.

The forming the blue light filtering film 100 on the non-planar surface of the substrate template specifically includes: forming the first refractive material layers 101 and the second refractive material layers 102, which are arranged alternately, in sequence on the non-planar surface of the substrate template, to form the blue light filtering film 100; or, forming the first refractive material layers 101 and the second refractive material layers 102, which are arranged alternately, in sequence on the non-planar surface of the substrate template, to form a multi-layer film, and placing the multi-layer film on the non-planar surface of the substrate template and pressing and shaping it, to form the blue light filtering film 100.

In an example, the first refractive material layers 101 and the second refractive material layers 102, which are arranged alternately, may be formed in sequence by an evaporation process or a chemical vapor deposition process.

To this, the embodiments of the present disclosure have been described in detail in conjunction with the drawings. According to the above description, those skilled in the art shall obtain a clear understanding of the blue light filtering film and the method of manufacturing the same according to the present disclosure.

It is noted that the hemispheric projection, hemispheric recess and half-cylindrical projection, half-cylindrical recess mentioned herein may be not in a hemispheric shape or in a half-cylindrical shape in a proper sense, but may be an approximate hemispheric or half-cylindrical shape. For example, the projection may be in an arched shape, rather than in a hemispheric shape in a proper sense. In this context, although some of lights with other wavelength will be lost, chromatic polarization for the blue light filtering film can be still reduced markedly with relative to that existing in prior art.

Based on the configuration of the above embodiments of the present disclosure, those skilled in the art may envisage obtaining other suitable projections and recesses in other arc-shaped forms and forming a blue light filtering film based on the obtained arc-shaped projection or recess in accordance with these configuration manners mentioned in the abovementioned embodiments, thereby achieving effect of filtering blue light and alleviating the chromatic polarization. In an embodiment of the present disclosure, the blue light filtering film has a non-planar structure, and for a light that is emitted at any incident angles from at least one side of the blue light filtering film, a transmission light involves a rather small chromatic polarization. In an embodiment of the present disclosure, the blue light filtering film with a non-planar structure has a plurality of projections, and the projections protrude towards one or either side and form a regularly-arranged projection structure or a projection-recess structure.

In addition, in other embodiments, where a plurality of projections and recesses are included, of the present disclosure, for example, a plurality of hollow arc-shaped projections and recesses are arranged alternately. However, it is not strict that the projections and the recesses are alternately arranged in a manner of one projection by one recess. Instead, they are alternately arranged in a manner of two projections by one recess or of several projections by several recesses. It is understood for those skilled in the art that chromatic polarization may be alleviated in these arrangements in which the projections and recesses are not strictly arranged in a manner of one-by-one.

It is noted that, in the drawings or the description, embodiments that are not illustrated or described all belong to those can be known by those skilled in the art and are not described in detail. In addition, the above definitions on various components is limited to the specific structure, shape or manner described above, and can be modified or replaced simply by those skilled in the art as below, for example:

(1) the blue light filtering film may be configured in other forms as long as the chromatic polarization can be alleviated;

(2) the terms for orientations in the embodiments, such as "upper", "lower", "forward", "backward", "right" and "left", are understood by referring to the drawings and are not used to limit scope of the present disclosure;

(3) the above embodiments may be mixed or combined with each other or with other embodiments depending on considerations on design and reliability, that is, the technical features in different embodiments may be freely combined to obtain further embodiments.

The above embodiments are provided to further describe in detail objects, technical solutions and advantages of the present disclosure. It is understood that the above description is only specific embodiments of the present invention, instead of limitation of the present invention. Any modifications, equivalent replacements that fall within inspirit and principle of the present invention should be included in the protective scope of the present invention.

What is claimed is:

1. A blue light filtering film comprising K+1 first refractive material layers and K second refractive material layers; wherein K is a natural number; wherein the K+1 first refractive material layers and K second refractive material layers are alternately arranged, the first refractive material layers and the second refractive material layers each has a thickness of one quarter of a wavelength of a blue light, and a refractivity of the first refractive material layer is greater than a refractivity of the second refractive material layer; and wherein the blue light filtering film has a non-planar structure.

2. The blue light filtering film according to claim 1, wherein, the blue light filtering film has a plurality of projections that are protruded towards one or either side thereof to form a regularly-arranged projection structure or a regularly-arranged projection-recess structure.

3. The blue light filtering film according to claim 2, wherein the plurality of projections form the regularly-arranged projection structure, and the blue light filtering film comprises N×M hollow hemispheric projections, which are closely arranged to form an array of hollow hemispheric projections arranged in N rows and M columns, where M and N are positive integers.

4. The blue light filtering film according to claim 2, wherein the plurality of projections form the regularly-arranged projection-recess structure, and the blue light filtering film comprises N rows of hollow hemispheric projections and N rows of hollow hemispheric recesses, each row of the hollow hemispheric projections comprises M hollow hemispheric projections and each row of hollow hemispheric recesses comprises M hollow hemispheric recesses, the N rows of hollow hemispheric projections and the N rows of hollow hemispheric recesses are closely and alternately arranged to form an array of the hollow hemispheric projections and the hollow hemispheric recesses, where M and N are positive integers.

5. The blue light filtering film according to claim 2, wherein the plurality of projections form the regularly-arranged projection-recess structure, and the blue light filtering film comprises an array of hollow hemispheric projections and hollow hemispheric recesses arranged in N rows and M columns, wherein, in the array, each row comprises M hollow hemispheric projections and hollow hemispheric recesses that are closely and alternately arranged, and each column comprises N hollow hemispheric projections and hollow hemispheric recesses that are closely and alternately arranged, where M and N are positive integers.

6. The blue light filtering film according to claim 2, wherein the plurality of projections form the regularly-arranged projection structure, and the blue light filtering film comprises N hollow half-cylindrical projections that are closely and alternately arranged, where N is a positive integer.

7. The blue light filtering film according to claim 2, wherein the plurality of projections form the regularly-arranged projection-recess structure, and the blue light filtering film comprises an array of N hollow half-cylindrical projections and N hollow half-cylindrical recesses that are closely and alternately arranged, where N is a positive integer.

8. A substrate for displaying, the substrate comprising the blue light filtering film according to claim 1.

9. The substrate according to claim 8, wherein the substrate is an array substrate or a color filter substrate.

10. The substrate according to claim 9, wherein the substrate is the array substrate, and the array substrate further comprises a base substrate and a plurality of pixel units; and the pixel units are provided at one side of the base substrate and the blue light filtering film is provided at the other side of the base substrate, or the blue light filtering film is provided between the substrate and the pixel units.

11. A display comprising the substrate according to claim 8.

12. A method of manufacturing the blue light filtering film according to claim 1, wherein, the method comprises:

manufacturing a substrate template for the blue light filtering film, at least one surface of the substrate template being a non-planar surface; and forming the blue light filtering film on the non-planar surface of the substrate template;

wherein the forming the blue light filtering film on the non-planar surface of the substrate template comprises:

forming the first refractive material layers and the second refractive material layers, which are arranged alternately, in sequence on the non-planar surface of the substrate template, to form the blue light filtering film; or forming the first refractive material layers and the second refractive material layers, which are arranged alternately, in sequence on the non-planar surface of the substrate template, to form a multi-layer film, and placing the multi-layer film on the non-planar surface of the substrate template and implementing a pressing molding, to form the blue light filtering film.

13. The method according to claim 12, wherein the forming a substrate template of the blue light filtering film comprises:

forming, on at least one surface of the substrate, an array of hemispheric projections, or an array of hemispheric projection-recess and half-cylindrical projections that are closely and alternately arranged, or an array of half-cylindrical projections that are closely arranged, or an array of half-cylindrical projections and half-cylindrical recesses that are closely and alternately arranged, to form the substrate template.

14. The method according to claim 12, wherein the first refractive material layers and the second refractive material layers, which are arranged alternately, are formed in sequence by an evaporation process or by chemical vapor deposition process.

* * * * *